Dec. 19, 1961  A. WINKLER  3,013,482
CAMERA CONTROL STRUCTURE
Filed March 26, 1958

INVENTOR.
Alfred Winkler
BY
Michael S. Striker
Attorney

United States Patent Office 3,013,482
Patented Dec. 19, 1961

3,013,482
CAMERA CONTROL STRUCTURE
Alfred Winkler, Munich, Germany, assignor to Agfa Aktiengesellschaft, Leverkusen-Bayerwerk, Germany
Filed Mar. 26, 1958, Ser. No. 724,151
Claims priority, application Germany Apr. 6, 1957
10 Claims. (Cl. 95—64)

The present invention relates to cameras.

More particularly, the present invention relates to photographic still cameras having aperture and exposure time adjusting members which are capable of being connected to each other for movement together. It is conventional to connect such adjusting members together through devices such as pawl and ratchet connection or a friction connection. The disadvantage of the pawl and ratchet type of connection is that it provides only a stepwise adjustment. As for the friction connection, this arrangement is subject to the disadvantage of permitting an adjusted element to be moved out of adjustment simply by being struck accidentally by another element. The manual operation required by connecting devices of this type as well as the adjustment of the aperture and exposure time independently when the adjusting elements are disconnected is relatively complicated for the average person.

One of the objects of the present invention is to overcome the above drawbacks by providing a steplessly adjustable arrangement for connecting the exposure time and aperture adjusting members with each other.

Another object of the present invention is to provide an arrangement which greatly simplifies the independent operation of these adjusting members.

A further object of the present invention is to provide a structure which may be operated in an extremely simple way for connecting or disconnecting the camera setting elements to each other.

It is also an object of the present invention to provide an arrangement of the above type which positions the adjusting members so that they are freely and comfortably accessible to the operator for easy trouble-free manipulation of the camera.

An additional object for the present invention is to provide a structure capable of accomplishing all of the above objects and at the same time composed of simple and ruggedly constructed elements which are very reliable in operation.

With the above objects in view, the present invention includes in a camera three adjusting members one of which is adjustable for setting the exposure time and another of which is adjustable for setting the aperture of the camera. In accordance with the present invention a means cooperates with each of the latter two members for releasably connecting the same with the third adjustable member so that by releasably connecting the exposure time adjusting member and the aperture adjusting member with the third member the latter may be adjusted for moving the exposure time and aperture adjusting members simultaneously while their positions with respect to each other do not change.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
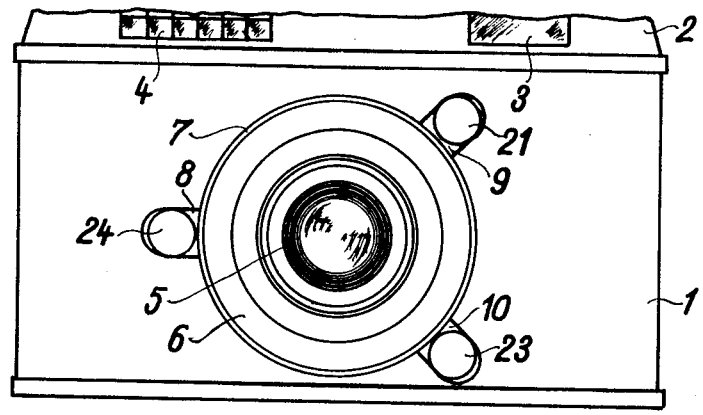
FIG. 1 is a fragmentary front elevational view of a camera according to the present invention.

Referring now to the drawings, there is shown therein a camera having a housing 1 and having beneath the fragmentarily illustrated cover member 2 a view finder 3 and a photoelectric cell 4 of an exposure meter which is built into the camera.

An adjusting member 7 according to the present invention is in the form of a ring concentrically arranged on the objective for turning movement about the optical axis, and this ring 7 is fixed with a lever 8 extending radially therefrom so as to be accessible to the operator for manual turning of the adjusting member 7. Also in accordance with the present invention a pair of additional rings 11 and 12 are arranged concentrically with the objective 5 for turning movement about the axis thereof, and a lever 9 is fixed to and extends radially from the ring 11 so as to be accessible to the operator for turning the latter ring, while a lever 10 is fixed to and extends radially from the ring 12 so as to be accessible to the operator for turning the ring 12. Thus, the rings 7, 11 and 12 form three adjusting members turnable about the optical axis and respectively carrying manually engageable levers. The rings 11 and 12 are located within the shutter housing 6 of the objective assembly. The ring 11 together with the lever 9 are turnable for adjusting the aperture of the camera in a well known manner, while the ring 12 together with the lever 10 are turnable for adjusting the exposure time in a well known manner. The levers 9 and 10 are operatively connected with the exposure meter of the camera. This connection may, for example, be such that the levers 9 and 10 operate upon an unillustrated totalizing drive located either in the shutter housing or in the camera housing and controlling the position of a pointer of the exposure meter which is moved in this way into alignment, for example, with a galvanometer pointer of the exposure meter. In accordance with the present invention a means is provided for releasably connecting each of the levers 9 and 10 the exterior surface of the ring 7. This ring 7 itself is turnable on the outer cylindrical surface of the tube 13 which is fixedly carried by the housing and which is coaxial with the optical axis, and this ring 7 is capable of being releasably fixed in an adjusted angular position on the tube 13.

The means for releasably fixing each of the levers 9 and 10 to the ring 7 as well as for fixing the lever 8 of the ring 7 to the tube 13 preferably take the form of wedging devices, and all of these devices have the same construction. Only the means for releasably fixing the lever 9 to the exterior surface of the ring 7 is described in detail below, but it is to be understood that identical structures are carried by the lever 10 and the lever 8 for releasably fixing the lever 10 with the exterior surface of the ring 7 and for releasably fixing the ring 7 on the tube 13.

Figure 3:
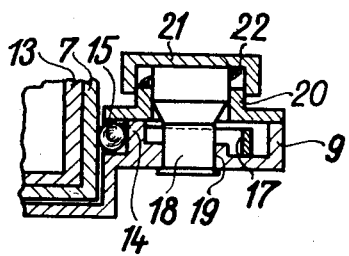
FIG. 3 is a fragmentary sectional view on an enlarged scale taken along the line III—III of FIG. 2 in the direction of the arrows.
Figure 2:
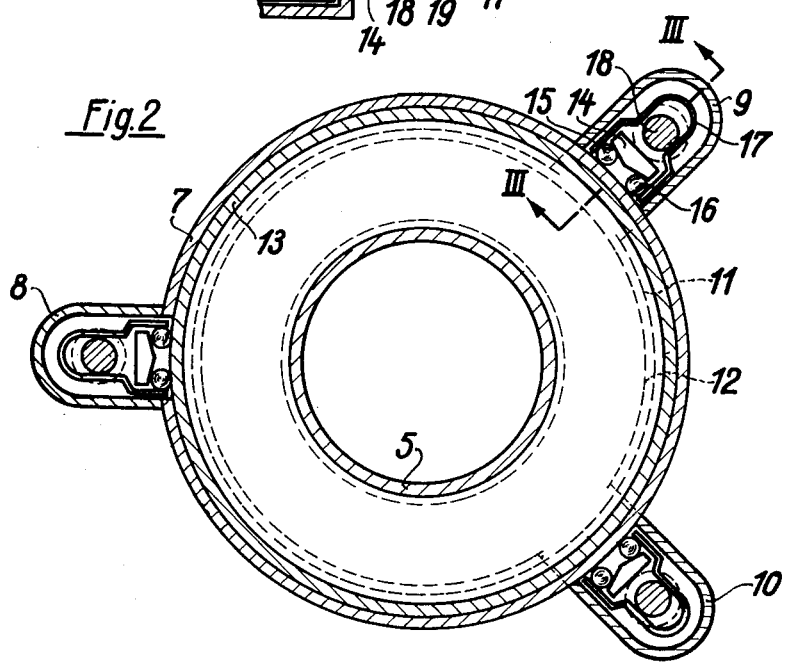
FIG. 2 is a sectional elevational view on an enlarged scale taken in a plane parallel to that of FIG. 1 and just behind that of FIG. 1.

As may be seen from FIGS. 2 and 3 the aperture adjusting lever 9 has the form of a hollow flat chamber which houses the means for releasably connecting the lever 9 with the ring 7. The lever 9 fixedly carries a wedge member 14 having a pair of oppositely inclined wedging surfaces shown most clearly in FIG. 2. These wedging surfaces are symmetrical with respect to each other and are directed toward the exterior surface of the ring 7. A pair of ball members 15 and 16 are respectively in engagement with the oppositely inclined wedging surfaces of member 14 as well as with the exterior surface of the ring 7. A spring means is provided for urging the ball members 15 and 16 toward each other so as to be wedged between the wedge member 14 and the ring 7, and this spring means takes the form of a substantially U-shaped leaf spring 17 which extends part way around a pin 18 and which has its free ends respectively in engagement with the ball members 15 and 16, as shown in FIG. 2, to urge these ball members toward each other. The pin 18 forms a means for releasing the connection between the lever 9 and the ring 7, and this pin is guided for axial movement in a bore 19 of the lever 9 as well as in a coaxial bore 20 of a wall fixed to the lever 9 in the manner shown in FIG. 3. The pin 18 fixedly carries at its outer end which is accessible to the operator a knob 21, and a spring 22 is arranged around the pin 18 between the knob 21 and the sleeve 20 for urging the pin 18 to the position shown in FIG. 3 where it does not act on the spring 17. It will be noted that the pin 18 is provided at its end distant from the knob 21 with an outwardly extending annular flange which engages the lever 9 to limit the movement of the pin 18 by the spring 22. Between its opposite ends which are of different diameters the pin 18 is provided with a frusto-conical surface portion, and the arrangement is such that when the pin 18 is moved by the operator against the force of spring 22 in a direction parallel to the optical axis inwardly toward the camera housing, the frusto-conical portion of the ring 18 will engage the opposite legs of the spring 17 to spread these legs apart from each other so as to release the ball members 15 and 16 and thus disconnect the lever 9 from the ring 7. It will be noted that with this arrangement the ball members 15 and 16 cooperate with the wedge member 14 to prevent movement of the lever 9 together with the ring 11 in either direction. However, upon applying pressure to the knob 21 the operator can freely turn the lever 9 together with the ring 11. It will be noted that with this construction a stepless adjustment is provided. All that is required to return the lever 9 to its condition fixed with the ring 7 is to release the knob 21, so that the spring 22 immediately moves the frusto-conical portion of pin 18 away from the spring 17 which then moves the ball members 15 and 16 back into their wedging engagement between member 14 and ring 7.

This same structure is provided between the lever 10 and the ring 7 as well as between the lever 8 and the exterior surface of the tube 13, and the lever 10 carries a knob 23 identical with the knob 21 for releasing the connection between the lever 10 and the ring 7, while the lever 8 carries a knob 24 identical with the knob 21 capable of being pressed upon by the operator for releasing the connection between the ring 7 and the tube 13.

The above-described structure operates as follows:

In the rest position of the parts all of the levers 8—10 are fixed. If for taking a particular picture the aperture and exposure time are to be set according to the particular conditions, then, for example, the lever 9 is first adjusted, after moving the pin 18 to release the connection between the lever 9 and the ring 7, and this lever 9 is set according to the preselected size of the aperture. Then the knob 21 is released and the lever 9 is fixed in this adjusted position to the ring 7 against further movement in either direction with respect to the ring 7. Then, the exposure time lever is turned with respect to the ring 7 after the operator presses on the knob 23, and the lever 10 is turned in this case until the pointer of the exposure meter which is turned by the above-mentioned totalizing drive becomes aligned with the galvanometer meter pointer of the exposure meter. At this time, the knob 23 is released so that the lever 10 is also fixed with the ring 7 against turning movement in either direction with respect thereto, and in this way the levers 9 and 10 are both fixed with respect to each other so that their position with respect to each other does not change. If it should happen that these settings do not correspond to the prevailing conditions for taking the picture, then the operator need only press on the knob 24 to release the ring 7 for turning movement with respect to the tube 13 by manual turning of the lever 8. Since the levers 9 and 10 are fixed with the ring 7 they turn together with the latter while maintaining the light value previously set into the camera by independent adjustment of the levers 9 and 10, so that if, for example, the exposure time is reduced by the turning of the lever 8 then simultaneously the aperture opening is correspondingly increased, or vice versa.

Of course, the exposure time lever 10 can be set to preselected value before the aperture lever 9, and, if desired, both of the knobs 21 and 23 may be pressed upon simultaneously by the operator to provide simultaneous adjustment of elements 9 and 10.

Inasmuch as both the aperture and the exposure time adjusting members as well as means for connecting them together are easily accessible to the operator and easily operable, it is possible to set the camera while it is in the picture-taking position, which is to say while the operator looks into the view finder, in a very simple way simply by arranging the pointer of the galvanometer meter of the exposure meter as well as the manually movable pointer so that they are visible in the view finder. Inasmuch as each adjusting lever is automatically secured against movement when it is not actuated by the operator, the independent adjustment of any one of the adjusting members cannot result in accidentally undesired movement of any other adjusting member.

Of course, the levers 8–10 can for certain purposes be arranged in a manner differently from that described above and can be grouped differently about the objective. For example, the positions of the levers 8 and 10 may be interchanged so that the levers 9 and 10 are easily accessible for two-hand operation. Also, if desired, the levers 8–10 can be positioned at least in part one above the other and they can have different lengths in such an arrangement.

The above-described structure can also be used when the levers 9 and 10 are connected in a different way with the exposure meter or even when they are not connected with an exposure meter. Particularly in the latter case one of the levers 9 and 10 can cooperate with a known scale of light values and the other lever can be provided with an index which cooperates with such a scale. Such a scale and index may advantageously be arranged on rings which are located next to each other or they may be arranged on ring sections which are coaxial with the ring 7 and connected respectively with the levers 9 and 10.

The releasable connecting means of the present invention can also be used where the members for adjusting the aperture and exposure time are connected directly with each other without the use of an intermediate ring such as the ring 7. Instead of ball members 15 and 16 cylindrical rollers may be used, and if desired, a weak spring may be arranged between each pair of ball members 15 and 16 for urging them apart from each other when the legs of the spring 17 are spread apart from each other. Furthermore, if desired, the members such as the pins 18 which are moved to release the wedging of the ball members may be mounted for movement radially with respect to the optical axis instead of parallel thereto.

It will be understood that each of the elements described above, or two or more together, may also find a useful application in other types of cameras differing from the types described above.

While the invention has been illustrated and described as embodied in a camera setting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the

What is claimed as new and desired to be secured by Letters Patent is:

1. In a camera, in combination, three manually movable adjusting members for setting the camera, one of said members being adjustable for setting the aperture of the camera and another of said members being adjustable for setting the exposure time of the camera; and first and second wedge means respectively cooperating with the latter two members for releasably fixing the same, respectively, to said third member for movement therewith so that movement of said third member will result in movement of said other two members while maintaining the positions of said other two members relative to each other, each of said wedge means including a wedge member having a pair of oppositely inclined surfaces directed toward a surface of said third member and a pair of ball members respectively engaging said pair of oppositely inclined surfaces and said surface of said third member, and spring means cooperating with said ball members for wedging the latter respectively between said oppositely inclined surfaces and said surface of said third member.

2. In a camera, in combination, three manually movable adjusting members for setting the camera, one of said members being adjustable for setting the aperture of the camera and another of said members being adjustable for setting the exposure time of the camera; a pair of manually engageable levers respectively fixed to and extending from the latter two members and accessible to the operator for setting the latter two members; a wedge member fixed to each of said levers and having a pair of oppositely inclined surfaces directed toward a surface of said third member; a pair of ball members respectively engaging the oppositely inclined surfaces of each wedge member and also engaging said surface of said third member; and spring means cooperating with each pair of ball members for urging the latter into wedging engagement respectively between said pair of oppositely inclined surfaces of each wedge member and said surface of said third member so that movement of said third member will result in movement of said other two members while maintaining the positions of said other two members relative to each other.

3. In a camera, in combination, three manually movable adjusting members for setting the camera, one of said members being adjustable for setting the aperture of the camera and another of said members being adjustable for setting the exposure time of the camera; a pair of manually engageable levers respectively fixed to and extending from the latter two members and accessible to the operator for setting the latter two members; a wedge member fixed to each of said levers and having a pair of oppositely inclined surfaces directed toward a surface of said third member; a pair of ball members respectively engaging the oppositely inclined surfaces of each wedge member and also engaging said surface of said third member; spring means cooperating with each pair of ball members for urging the latter into wedging engagement respectively between said pair of oppositely inclined surfaces of each wedge member and said surface of said third member so that movement of said third member will result in movement of said other two members while maintaining the positions of said other two members relative to each other; and manually operable means carried by each of said levers for placing each of said pair of ball members out of wedging engagement with each wedge member and said surface of said third member so that each lever and the member connected thereto can be independently adjusted.

4. In a camera, in combination, three manually movable adjusting members for setting the camera, one of said members being adjustable for setting the aperture of the camera and another of said members being adjustable for setting the exposure time of the camera; a pair of manually engageable levers respectively fixed to and extending from the latter two members and accessible to the operator for setting the latter two members; a wedge member fixed to each of said levers and having a pair of oppositely inclined surfaces directed toward a surface of said third member; a pair of ball members respectively engaging the oppositely inclined surfaces of each wedge member and also engaging said surface of said third member; spring means cooperating with each pair of ball members for urging the latter into wedging engagement respectively between said pair of oppositely inclined surfaces of each wedge member and said surface of said third member so that movement of said third member will result in movement of said other two members while maintaining the positions of said other two members relative to each other; and manually operable means carried by each of said levers for placing each of said pair of ball members out of wedging engagement with each member and said surface of said third member, said manually operable means being supported by each lever for movement in a direction parallel to the optical axis of the camera.

5. In a camera, in combination, an objective; three rings coaxially surrounding the optical axis of said objective and turnable about said axis, one of said rings being turnable for setting the aperture of the camera and another of said rings being turnable for setting the exposure time of the camera; a pair of levers respectively fixed to and extending radially from the latter two rings and accessible to the operator for turning said rings, respectively; a pair of wedge members respectively carried by said levers and each having a pair of oppositely inclined wedging surfaces extending over and directed toward an exterior surface of the third ring; a pair of ball members respectively engaging the oppositely inclined surfaces of each wedge member and said exterior surface of said third ring; spring means cooperating with each pair of ball members for urging the latter into wedging engagement between each wedge member and said surface of said third ring for fixing said two rings to said third ring for turning movement with the latter, so that turning of said third ring will result in turning of the other two rings while maintaining the angular positions of said other two rings relative to each other; and a release means carried by each lever for movement in a direction parallel to the optical axis and accessible to the operator to be moved to a position releasing each pair of ball members from wedging engagement.

6. In a camera having an objective, in combination, three manually movable ring members turnable independent from each other about the axis of the objective for setting the camera, one of said members being adjustable for setting the aperture of the camera and another of said members being adjustable for setting the exposure time of the camera; and means cooperating with the latter two members for releasably connecting the latter in any adjusted position thereof with the third of said members for movement therewith, so that movement of the third member will result in movement of said first and second members while maintaining the positions of said first and second members relative to each other.

7. In a camera having an objective, in combination, three manually movable ring members turnable independent from each other about the axis of the objective for setting the camera, one of said members being adjustable for setting the aperture of the camera and another of said members being adjustable for setting the exposure time of the camera; a pair of means respectively cooperating with said one and said oother member for releasably connecting said two members in any adjusted position thereof with the third of said members for movement therewith, so that movement of the third member will result in movement of said first and second members while maintaining the positions of said first and second members relative to each other; and means cooperating with said third member for releasably fixing the latter in any adjusted position.

8. An arrangement as defined in claim 6 and including a manually engageable lever fixed to and extending from each of said ring members and in which said means are respectively carried by said levers.

9. In a camera having a front wall carrying an objective, in combination, an annular member fixed to and projecting forwardly from said front wall and being concentrically arranged with the axis of the objective; a pair of manually movable annular adjusting members for setting the camera, said members being mounted turnable about the axis of the objective, one of said members being adjustable for setting the aperture of the camera and the other of said members being adjustable for setting the exposure time of the camera; a manually movable coupling member also turnable about said axis independent of the movement of said two adjusting members; means cooperating with said pair of annular adjusting members for releasably connecting the latter with said annular coupling member for movement therewith, so that movement of said coupling member will result in movement of said adjusting members while maintaining the positions of the latter relative to said coupling member; and means cooperating with said coupling member for fixing the position thereof relative to said stationary annular member.

10. In a camera, in combination, a pair of members movable with respect to each other, at least one of said members being a manually movable adjusting member for setting the camera; and wedge means cooperating with said manually movable adjusting member for releasably fixing the same to the other of said members, said wedge means including a wedge member having a pair of oppositely inclined surfaces directed toward a surface of said other member, a pair of ball members respectively engaging said oppositely inclined surfaces and said surface of said other member, and spring means cooperating with said ball members for wedging the latter respectively between said oppositely inclined surfaces and said surface of said other member.

References Cited in the file of this patent

UNITED STATES PATENTS

| 1,935,430 | Barnack | Nov. 14, 1933 |

FOREIGN PATENTS

| 163,978 | Australia | Sept. 10, 1949 |
| 1,094,681 | France | Dec. 8, 1954 |
| 1,124,388 | France | June 25, 1956 |
| 1,126,831 | France | July 30, 1956 |